(12) United States Patent
Numata

(10) Patent No.: US 8,272,820 B2
(45) Date of Patent: Sep. 25, 2012

(54) ROPE FASTENING DEVICE

(76) Inventor: Yukio Numata, Tokyo (JP)

( * ) Notice: Subject to any disclaimer, the term of this patent is extended or adjusted under 35 U.S.C. 154(b) by 168 days.

(21) Appl. No.: 12/743,611

(22) PCT Filed: Jun. 24, 2008

(86) PCT No.: PCT/JP2008/061451
§ 371 (c)(1),
(2), (4) Date: May 19, 2010

(87) PCT Pub. No.: WO2009/066482
PCT Pub. Date: May 28, 2009

(65) Prior Publication Data
US 2010/0284757 A1  Nov. 11, 2010

(30) Foreign Application Priority Data
Nov. 19, 2007 (JP) .................. 2007-298963

(51) Int. Cl.
*B60P 7/08* (2006.01)
(52) U.S. Cl. ........................ 410/103; 410/100
(58) Field of Classification Search ............ 410/12, 410/97, 100, 103; 254/220, 229, 343; 242/395, 242/532.6, 901
See application file for complete search history.

(56) References Cited

U.S. PATENT DOCUMENTS 5,234,298 A * 8/1993 Shuker ...................... 410/98
5,295,664 A   3/1994 Kämper

FOREIGN PATENT DOCUMENTS

| JP | 50-58715 | 5/1975 |
| JP | 7-32934 | 2/1995 |
| JP | 3011761 | 2/2000 |
| JP | 2002-362218 | 12/2002 |

OTHER PUBLICATIONS

International Search Report issued Jul. 29, 2008 in International (PCT) Application No. PCT/JP2008/061451.

* cited by examiner

*Primary Examiner* — Stephen Gordon
(74) *Attorney, Agent, or Firm* — Wenderoth, Lind & Ponack, LLP.

(57) ABSTRACT

A rope fastening device (11) can be provided at a predetermined position of a vehicle for fastening a rope (20) placed over freight on the vehicle. The rope fastening device (11) has a rope winding drum (12) having a rope hitch opening (19), a worm wheel (13) with which the drum (12) is operatively associated, a worm (14) meshing with the worm wheel (13), a rotation shaft (15) connected to the worm (14), a rotating tool (16) provided at an end of the rotation shaft (15), a gear box (17) in which the worm wheel (13) and the worm (14) are received, and an installation section (18) fitted to the gear box (17). The rope fastening device (11) can prevent a collapse of freight on a vehicle etc. by reliably fastening with simple operation a rope or other fastening materials placed over the freight.

7 Claims, 4 Drawing Sheets

FIG. 4 - PRIOR ART
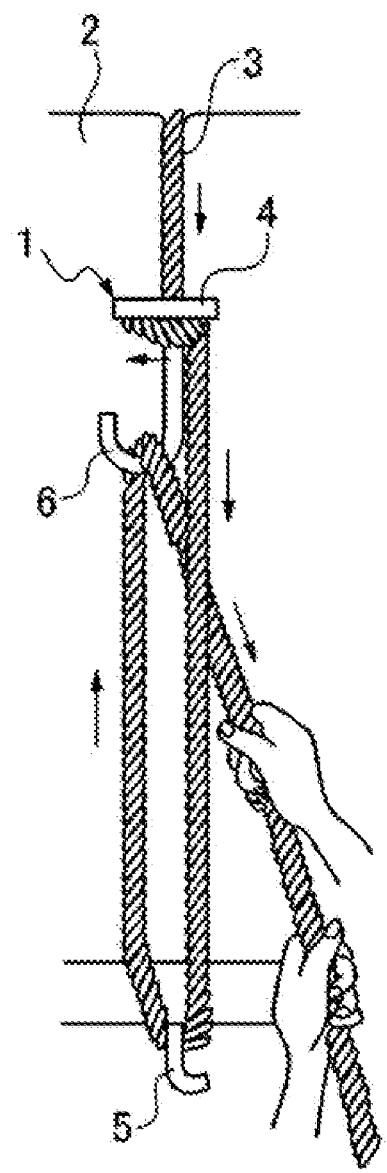

ROPE FASTENING DEVICE

BACKGROUND OF THE INVENTION

1. Technical Field

The present invention relates to a rope fastening device and, more specifically, to a rope fastening device configured to securely fasten mainly ropes or the like placed around freight on a vehicle or the like and prevent freight collapse with a simple operation.

2. Background Art

Conventionally, freight loaded on a carrying bed of a vehicle such as a truck is generally fixed with a rope by manpower using a fastening method such as tracker's hitch.

On the other hand, as an auxiliary jig used for fastening the rope, a rope tensioner 1 shown in FIG. 4 is known. The rope tensioner 1 includes a stopper member 4 for winding and fixing a rope 3 placed around freight 2, and a hook member 6 for hooking the rope 3 after having hooked around a side hook 5 of the vehicle upward thereof (see JP-A-7-32934, and JP-A-2002-362218).

In such a conventional method on the basis of manpower, a significant force is necessary for a fastening operation even when an auxiliary jig is used. Therefore, a plurality of workers is necessary depending on the case, which provides a problem in terms of operating cost.

A fastening method such as use of a trucker's hitch is a special method, and getting hold of workers who have the capability of doing this fastening method without fault is difficult in many cases.

If the force to fasten the rope is not sufficient, the rope might be loosened during the travel. In such an event, there arises the need to do an inefficient job of re-fastening the rope on a road. In addition, loosening of the rope during the travel may cause a collapse of freight piles or a fall, which leads to a safety hazard.

Therefore, in the case of the prior art, there are problems to be solved in order not to require the force or the specific fastening method, to fasten the rope reliably with a simple operation, and to prevent loosening of the rope once fastened.

SUMMARY OF THE INVENTION

As specific means for solving the problems in the prior art described above, the present invention provides a rope fastening device provided at a predetermined position of a vehicle and configured to fasten a rope placed around freight loaded on the vehicle, comprising at least: a drum being rotatable freely for allowing the rope to be wound therearound and including a rope hitch opening for allowing the rope to be hitched therethrough; a worm wheel coupled with the drum so as to move in conjunction with the rotation of the drum; a worm engaged with the worm wheel; a rotating shaft extending continuously from the worm; a rotating tool provided at an end of the rotating shaft for rotating the rotating shaft; a gear box in which the worm wheel and the worm are stored; and a mounting portion provided on the gear box for mounting the rope fastening device to the vehicle.

The drum has a configuration in which it is formed into a cylindrical shape and is bifurcated from a substantially center portion toward a distal end portion thereof to define the rope hitch opening, and the rotating tool is configured to be a manually-operated handle or an electric motor-driven rotating device.

The rope fastening device according to the present invention is provided at the predetermined position of the vehicle and configured to fasten the rope placed around the freight loaded on the vehicle. The device includes at least: the drum allowing the rope to be wound therearound and including the rope hitch opening; the worm wheel which the drum moves in conjunction with; the worm engaged with the worm wheel; the rotating shaft extending continuously from the worm; the rotating tool provided at the end of the rotating shaft; the gear box in which the worm wheel and the worm are stored; and the mounting portion provided on the gear box, so that a worm gear is activated by rotating the rotating shaft, whereby the drum is rotated while winding the rope. In other words, the rope placed around the freight can be fastened easily.

In this case, the rope can be reliably fastened with a power dozens of times manpower with little force, owing to the characteristics of the worm gear which provide a large reduction gear ratio.

Also, since the normal self-locking worm gear has the characteristic of not rotating inversely from the side of the worm wheel, the rope that is fastened once is never loosened. In other words, since the rope placed around once is not loosened during the travel, an accident such as a collapse of freight piles does not occur. In addition, a stopper device for preventing the reverse rotation does not have to be provided. As described above, the provision of the above-described worm gear provides various advantages.

The drum is formed into the cylindrical shape, and is bifurcated from the substantially center portion toward the distal end portion thereof to define the rope hitch opening, so that the rope is reliably wound without slippage by hitching the rope through the rope hitch opening so as to trace out a figure eight.

Likewise, since the rope is hitched through the rope hitch opening so as to trace out a figure eight, even when the rope is as long as 10 m to 20 m for example, a mid portion thereof can be hitched through the rope hitch opening. In this case, a remaining part of the rope can be advantageously used for fixing the freight at a different position. With the provision of the drum as described above, various excellent advantages are achieved.

In addition, the rotating tool is manually-operated handle or an electric motor-driven rotating device, so that the rotating shaft can be rotated with the manually-operated handle. Alternatively, the rotating shaft can be rotated automatically by operating the electric motor-driven rotating device from a driver's seat. With the provision of the rotating tool as described above, excellent advantages as described above are achieved.

BRIEF DESCRIPTION OF DRAWINGS

FIG. 4 is an explanatory drawing showing a state in which a rope tensioner 1 in the prior art is used.

DETAILED DESCRIPTION OF THE INVENTION

Figure 1:
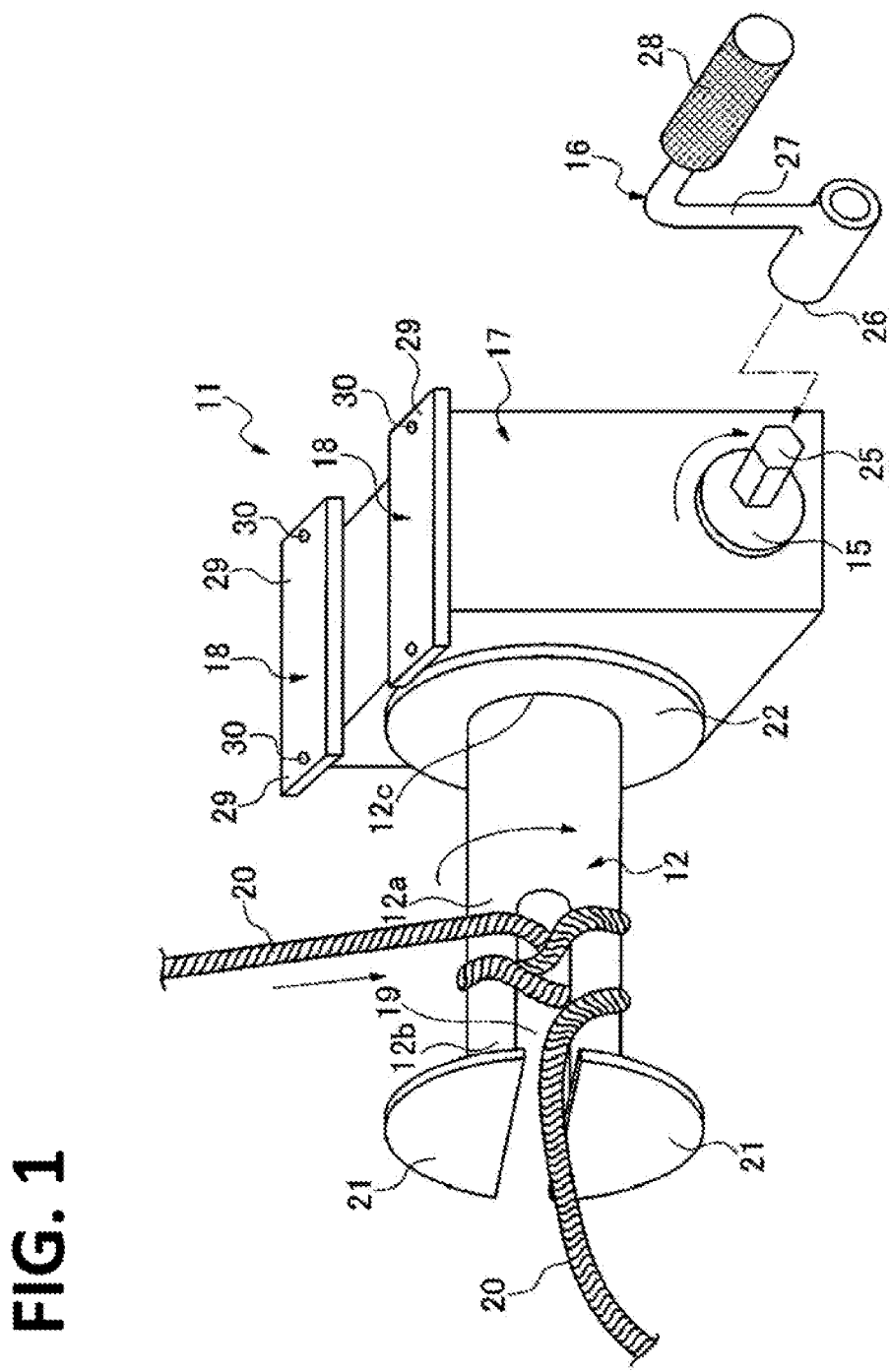
FIG. 1 is a perspective view of a rope fastening device 11 according to the present invention.
Figure 2:
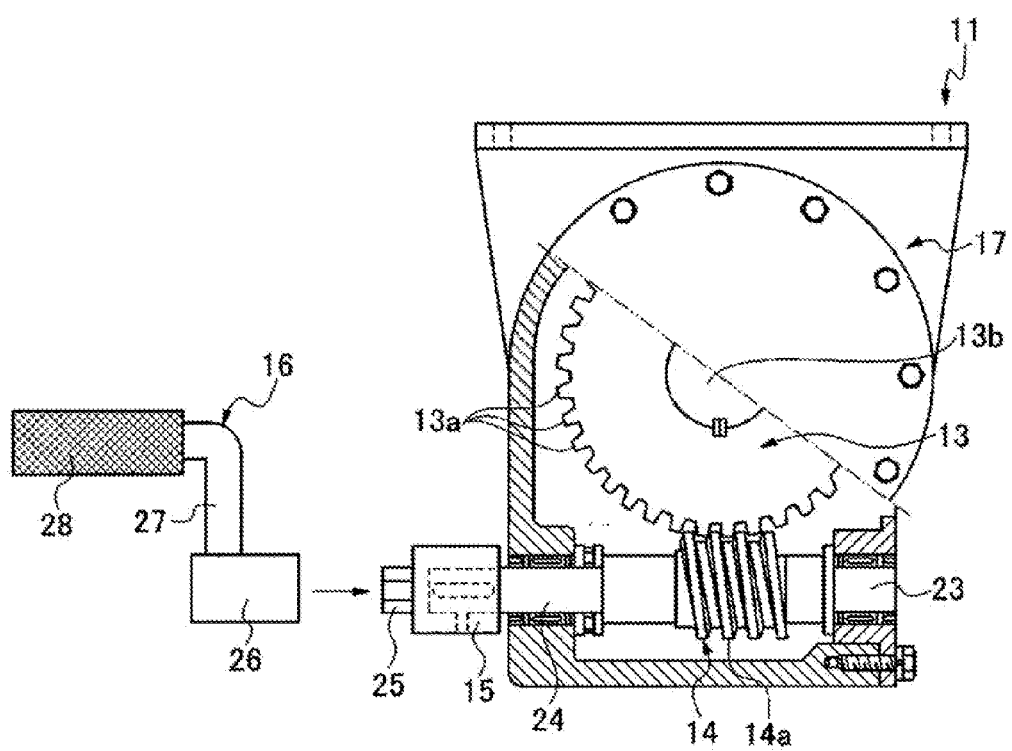
FIG. 2 is a partly exploded explanatory drawing showing a principal portion of the rope fastening device 11 according to the present invention.

Referring now to the drawings, an embodiment of the present invention will be described. In FIGS. 1 and 2, reference numeral 11 shows a rope fastening device. The rope fastening device 11 includes an axially elongated cylindrical drum 12 for allowing a rope to be wound therearound, a worm wheel 13 which is moved in conjunction with the drum 12, a worm 14 engaged with the worm wheel 13, a rotating shaft 15 extending continuously from the worm 14, a handle 16 (rotating tool) provided at an end of the rotating shaft 15, a gear box 17 in which the worm wheel 13 and the worm 14 are stored, and mounting portions 18 provided on the gear box 17.

The drum 12 is formed into a cylindrical shape, and is bifurcated from a substantially center portion 12a toward distal end portion 12b thereof to define a pair of legs separated by a rope hitch opening (slit) 19 that opens through the distal end portion 12b. By hitching a rope 20 through the rope hitch opening 19 so as to trace out a figure eight as shown in FIG. 1, the rope 20 is reliably wound without slippage.

Likewise, since the rope 20 is hitched through the rope hitch opening 19 so as to trace out a figure eight, even when the rope 20 is as long as 10 m to 20 m for example, a mid portion thereof can be hitched through the rope hitch opening 19. In this case, a remaining part of the rope 20 can be advantageously used for fixing freight at a different position.

The distal end portion 12b and a rear end portion 12c of the drum 12 are provided with flange portions 21, 22 respectively. With the presence of the flange portions 21, 22, the rope 20 wound once does not come off outward.

The rear end portion 12c of the drum 12 is provided with an operating shaft 13b, and the worm wheel 13 is provided continuously at an end of the operating shaft 13b.

The worm wheel 13 includes teeth 13a formed continuously on an outer periphery of a disk as shown in FIG. 2, and is a so-called screw gear formed so as to be freely rotatable.

The worm 14 includes teeth 14a formed continuously in a helical manner on a shaft as shown in FIG. 2, and is a so-called helical gear. The worm 14 and the worm wheel 13 are engaged to constitute a worm gear. Here, the worm gear in the present invention has a normal self-locking configuration.

Input shafts 23, 24 at both ends of the worm 14 are rotatably supported at predetermined positions of the gear box 17, respectively. Then, the input shaft 24 on one side is continued to the rotating shaft 15.

The rotating shaft 15 is provided with a hexagonal shaft 25 at the end thereof, so that a fitting portion 26 of the handle 16 can be detachably fitted to the hexagonal shaft 25.

The handle 16 (rotating tool) includes the fitting portion 26, an arm 27 bent with respect to the fitting portion 26 by 90 degrees and a grip 28 bent with respect to the arm by 90 degrees, and the rotating shaft 15 can be rotated by rotating the handle while gripping the grip 28.

Instead of the handle 16, it is also possible to provide an electric motor-driven rotating device (rotating tool), not shown, at the end of the rotating shaft 15. In this case, the rotating device may be configured as a 24V battery-driven type device so that the rotating shaft 15 can be rotated automatically by remote-controlling the rotating device from a driver's seat. In addition, it is also possible to configure the device in such a manner that when the rope is loosened during the travel, a sensor or the like senses the loosening and activates the rotating device automatically.

In the gear box 17, the worm wheel 13 and the worm 14, that is, the mechanism of the worm gear is stored. As described above, both input shafts 23, 24 of the worm 14 are rotatably supported at the predetermined positions of the gear box 17.

The mounting portions 18 are provided at four corners in a state in which plate strips 29 are protruded outward, and the respective plate strips 29 are formed with hole portions 30. Screws or the like are inserted into the hole portions 30 to mount the device on an underside or the like of a carrying bed of the vehicle in a fixed state.

Since the rope fastening device 11 configured as described above is provided with the worm gear including the worm wheel 13 and the worm 14, when the rotating shaft 15 is rotated by rotating the handle 16, the worm gear is activated and the drum 12 is rotated while winding the rope 20. In other words, the rope 20 placed around the freight can be fastened easily.

Subsequently, an example of using the rope fastening device 11 having the configuration as described above in a state of being mounted on the vehicle will be described.

Figure 3:
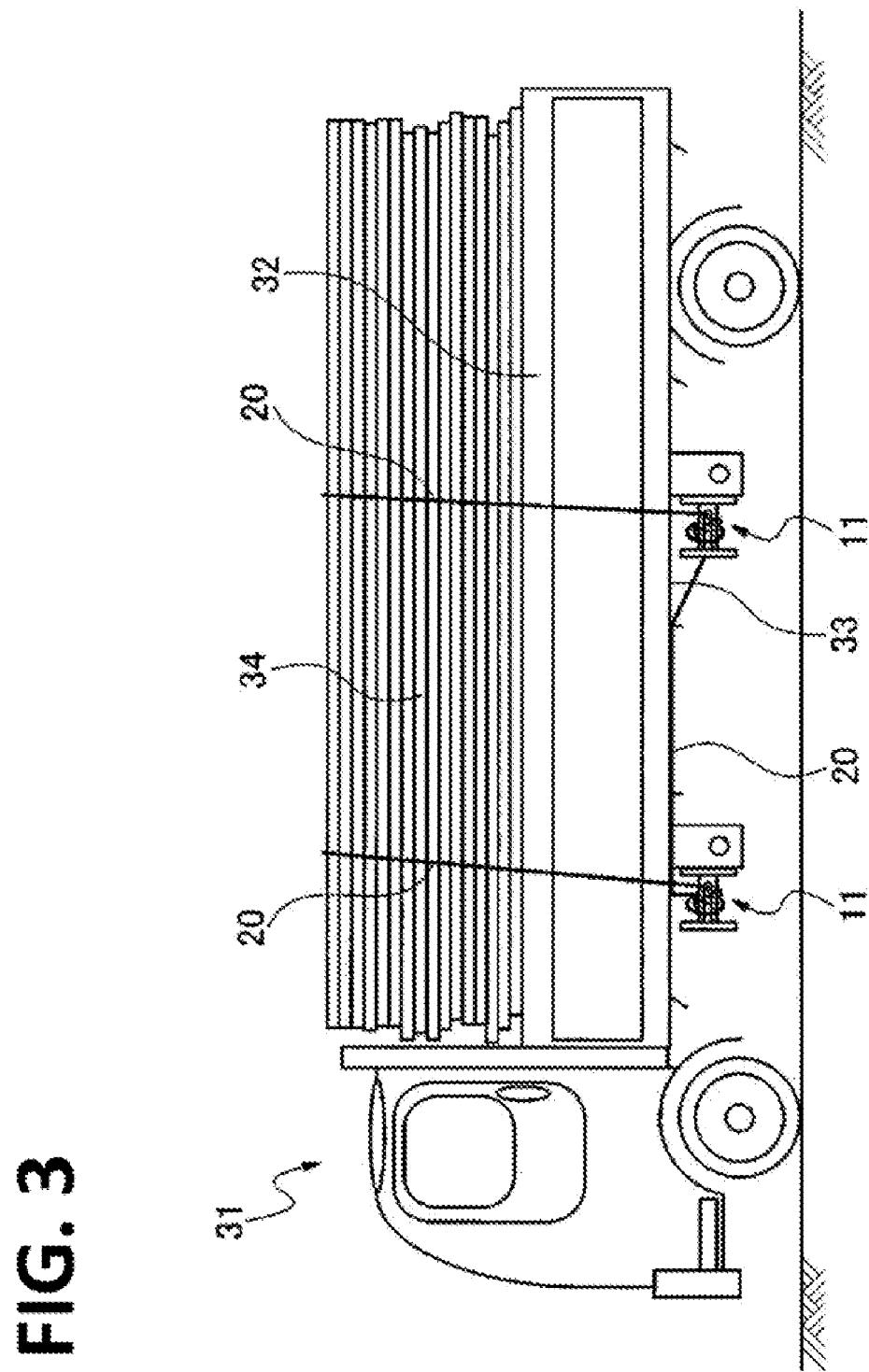
FIG. 3 is a side view of a truck 31 showing a state in which a rope 20 placed around freight 34 is fastened using the rope fastening device 11 according to the present invention.

As shown in FIG. 3, the rope fastening devices 11 are mounted on an underside 33 of a carrying bed 32 of a truck 31 at a plurality of positions on the left and right sides in pairs at predetermined intervals. The number of the rope fastening devices 11 to be installed differs depending on the size or the like of the carrying bed of the vehicle as a matter of course.

Then, as shown in FIG. 1, the rope 20 is hitched through the rope hitch opening 19 so as to trace out a figure eight. In this manner, by hitching the rope 20, the rope 20 is reliably wound without slippage. Even when the rope 20 is long, the mid portion thereof can be hitched through the rope hitch opening 19. Therefore, freight 34 can be fixed at a different position using the remaining part of the rope 20 (see the rope 20 in FIG. 3).

When the rotating shaft 15 is rotated by rotating the handle 16, the worm gear is activated, and the drum 12 is rotated while winding the rope 20, whereby the rope 20 placed around the freight 34 is fastened.

At this time, the rope 20 can be reliably fastened with a power dozens of times manpower owing to the characteristics of the worm gear that provide a large reduction gear ratio even when a driver does not have enough strength.

Also, since the worm gear has the characteristic of not rotating inversely from the side of the worm wheel 13, the rope 20 fastened once is never loosened. In other words, since the rope 20 placed around once is not loosened during the travel, an accident such as freight collapse does not occur. In addition, a stopper device for preventing the reverse rotation does not have to be provided on the rope fastening device 11.

The rope fastening device 11 in the present invention is used in a case of fastening the rope 20 placed around the freight 34 on the carrying bed 32 of the truck 31. However, it can be applied to various cord-type elongated objects such as a band rope and a wire instead of the rope.

Also, it can be used by installing at places where prevention of the freight collapse is needed like in a ship, in a freight train, in a warehouse, or in a construction side in addition to the vehicle such as the truck 31.

The invention claimed is:
1. A rope fastening device comprising:
  a gear box configured to be mounted on a predetermined position of a vehicle;
  a worm wheel rotatably mounted in the gear box;
  a worm rotatably mounted in the gear box and engaged with the worm wheel;
  an axially elongated cylindrical drum having a proximal rear end, a distal front end, and a center portion between the proximal rear end and the distal front end, the proximal rear end of the drum being fixed to the worm wheel so that the cylindrical drum is rotatable with the worm wheel, the axially elongated cylindrical drum extending axially from the worm wheel such that the axially elongated cylindrical drum extends outwardly away from the gear box;
  a rotating shaft continuous with the worm so as to rotate together with the worm; and a rotating tool engageable with the rotating shaft to rotate the worm wheel via the worm;

wherein the axially elongated cylindrical drum is bifurcated to form a pair of legs separated by a slit that extends from the distal front end to the center portion of the axially, elongated cylindrical drum, the slit opening through the distal front end of the axially elongated cylindrical drum so as to allow a rope to be wound in a figure eight about an outer periphery of the axially elongated cylindrical drum and through the slit of the axially elongated cylindrical drum.

2. The rope fastening device according to claim 1, wherein a distal front end flange portion is provided at the distal front end of the cylindrical drum so as to extend radially outwardly from the distal front end of the cylindrical drum the flange portion having a slit aligned with the slit separating the pair of legs of the cylindrical drum, so as to allow the rope to be wound in the figure eight about the outer periphery of the cylindrical drum and through the slit of the axially elongated cylindrical drum and the slit of the flange portion.

3. The rope fastening device according to claim 1, wherein the rotating tool is constituted by one of a manually-operated handle and an electric motor-driven rotating device.

4. The rope fastening device according to claim 3, wherein the rotating tool is constituted by the manually-operated handle.

5. The rope fastening device according to claim 3, wherein the rotating shaft has a tool-engaging shaft portion, and the rotating tool has a rotating shaft-engaging fitting portion configured to engage the tool-engaging shaft portion of the rotating shaft.

6. The rope fastening device according to claim 1, wherein the rotating shaft has a tool-engaging shaft portion, and the rotating tool has a rotating shaft-engaging fitting portion configured to engage the tool-engaging shaft portion of the rotating shaft.

7. The rope fastening device according to claim 2, wherein a proximal rear end flange portion is provided at the proximal rear end of the cylindrical drum so as to extend radially outwardly from the proximal rear end of the cylindrical drum, such that a portion of the outer periphery of the cylindrical drum between the proximal rear end flange portion and the distal front end flange portion is provided for winding of the rope between the proximal rear end flange portion and the distal front end flange portion.

* * * * *